United States Patent [19]

Liu

[11] Patent Number: 5,741,056
[45] Date of Patent: Apr. 21, 1998

[54] PROJECTING HEAD MECHANISM OF A PROJECTING MACHINE

[75] Inventor: Tom Liu, Taipei Hsien, Taiwan

[73] Assignee: Primax Electronics Ltd., Taipei Hsien, Taiwan

[21] Appl. No.: 839,076

[22] Filed: Apr. 23, 1997

[51] Int. Cl.[6] .................................................. G03B 21/14
[52] U.S. Cl. ........................................ 353/56; 353/DIG. 6
[58] Field of Search ....................... 353/DIG. 6, DIG. 3, 353/119, 52, 56, 63, 65

[56] References Cited

U.S. PATENT DOCUMENTS 4,634,246  1/1987  Dreyer, Jr. ........................ 353/DIG. 6
4,795,252  1/1989  Kyhl ................................. 353/DIG. 6
5,172,144  12/1992  Hetrick ........................... 353/DIG. 6

Primary Examiner—William C. Dowling
Attorney, Agent, or Firm—Bacon & Thomas

[57] ABSTRACT

A projecting head mechanism of a projecting machine adapted to project an image generated by a non-reflective document is disclosed. A thermo-conducting metal piece is installed in the projecting head mechanism and the internal surface area of a projecting mirror is coated with silicon compound for evenly and repidly distributing the heat generated by the light beam received by the projecting mirror over the surface area of the projecting mirror, so that the heat will not be concentrated on a spot to damage the projecting machine.

2 Claims, 2 Drawing Sheets

PROJECTING HEAD MECHANISM OF A PROJECTING MACHINE

BACKGROUND OF THE INVENTION

1. Field of the Invention

The present invention relates to a projecting head mechanism, and more particularly to a projecting head mechanism which can evenly and quickly distribute heat over the projecting machine.

2. Description of the Prior Art

Please refer to FIG. 1 which shows a traditional over head projector. It comprises a main body 10, a transparent platform 101 located on the main body 10, a projecting head mechanism including an upper cover 111, a lower cover 112, a lens 113 and a projecting mirror 114.

When in use, a light beam generated by a light source (not shown) in the main body 10 will be collected by an optical apparatus (usually includes a condenser and a Fresnel lens) and will penetrate the transparent platform 101 and transmit the image of an non-reflective document (not shown) to the lens 113 for focusing, the image of the document will be then projected to a screen display via the projecting mirror 114 for displaying the image thereon.

The upper cover 111 and the lower cover 112 will be seperately opened in operation. The position where the image is projected over the screen display can be adjusted by adjusting the position of the upper cover 111. While the upper and lower covers 111, 112 will be closed to prevent dusts, when the machine is not used.

However, when the machine is re-started without opening the upper and lower covers 111, 112, the heat generated by the light beam will be concentrated on a spot on the projecting mirror 114, the projecting mirror 114 will thus be damaged by the heat within a few minutes.

To prevent such events, a notice such as "cover of the projecting mirror has to be opened before the power is turned on" is usually placed on user guides, or labelled on the plastic cover near the projecting mirror for reminding users. In other words, there is no solution for traditional projectors to get rid of such problem.

SUMMARY OF THE INVENTION

It is therefore a primary objective of the present invention to provide a projecting head mechanism of a projecting machine which can prevent damage caused by misuse of the machine.

In brief, the projecting head mechanism according to the present invention comprises:

(1) an upper cover having an internal surface area;

(2) a lower cover engaged with the upper cover;

(3) a focusing member mourned on the lower cover for causing the image to be focused;

(4) a projecting member mounted on the internal surface area of the upper cover for projecting the focused image to the screen display; and (5) a thermo-conducting device provided between the projecting member and the internal surface area of the upper cover for evenly distributing the heat generated by the light beam over an outer surface area of the projecting member.

In accordance with another aspect of the present invention, the thermo-conducting device includes a thermo-conducting metal piece installed between the projecting member and the internal surface area of the upper cover, an elastic member installed between the internal surface area of the upper cover and the thermo-conducting metal piece for biasing the thermo-conducting metal piece against the projecting member, and silicon compound coated over an internal surface area of the projecting member.

The present invention may best be understood through the following description with reference to the accompanying drawings, in which:

DETAILED DESCRIPTION OF THE PREFERRED EMBODIMENT

Figure 1:
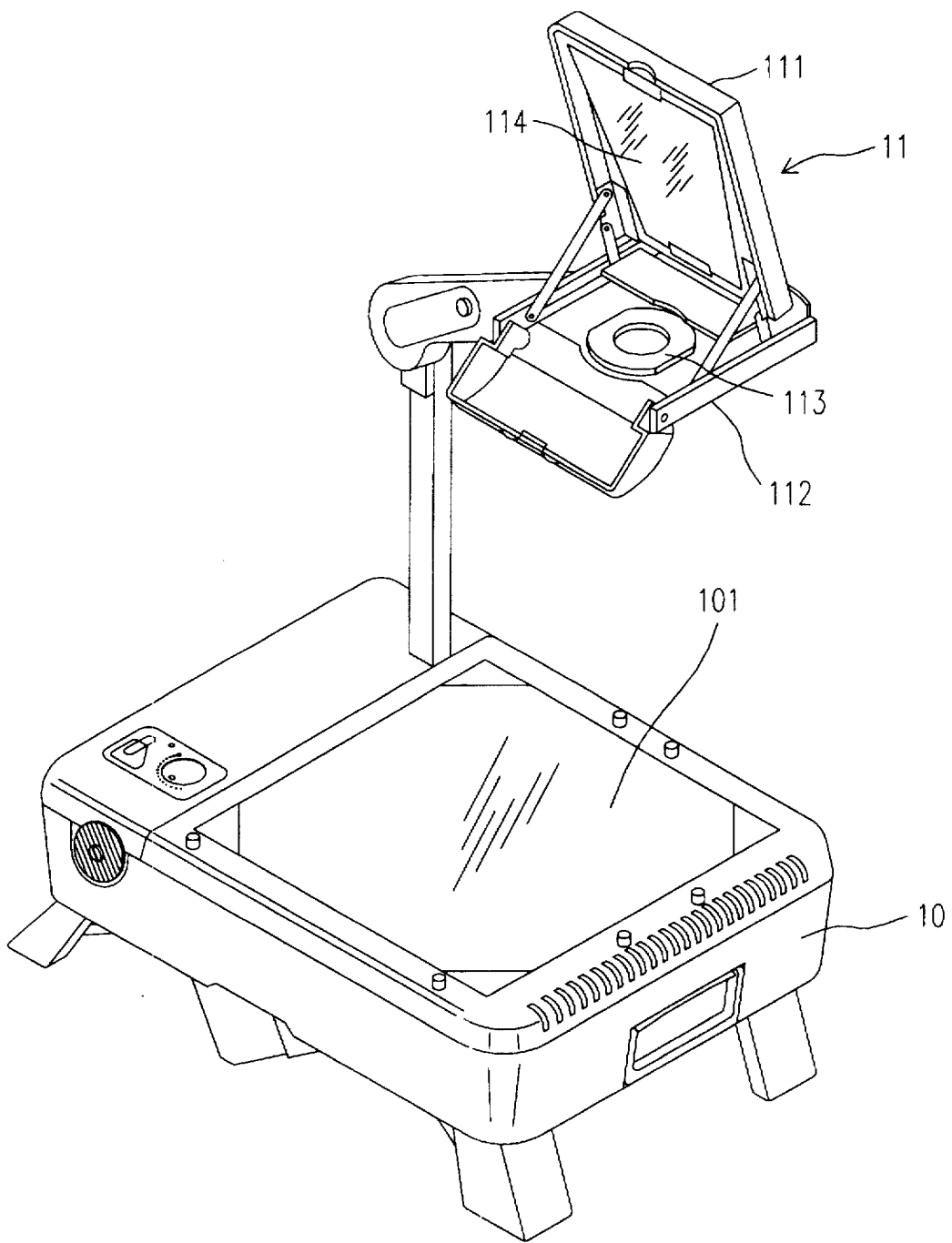
FIG. 1 is a perspective view of a traditonal optical projector.
Figure 2:
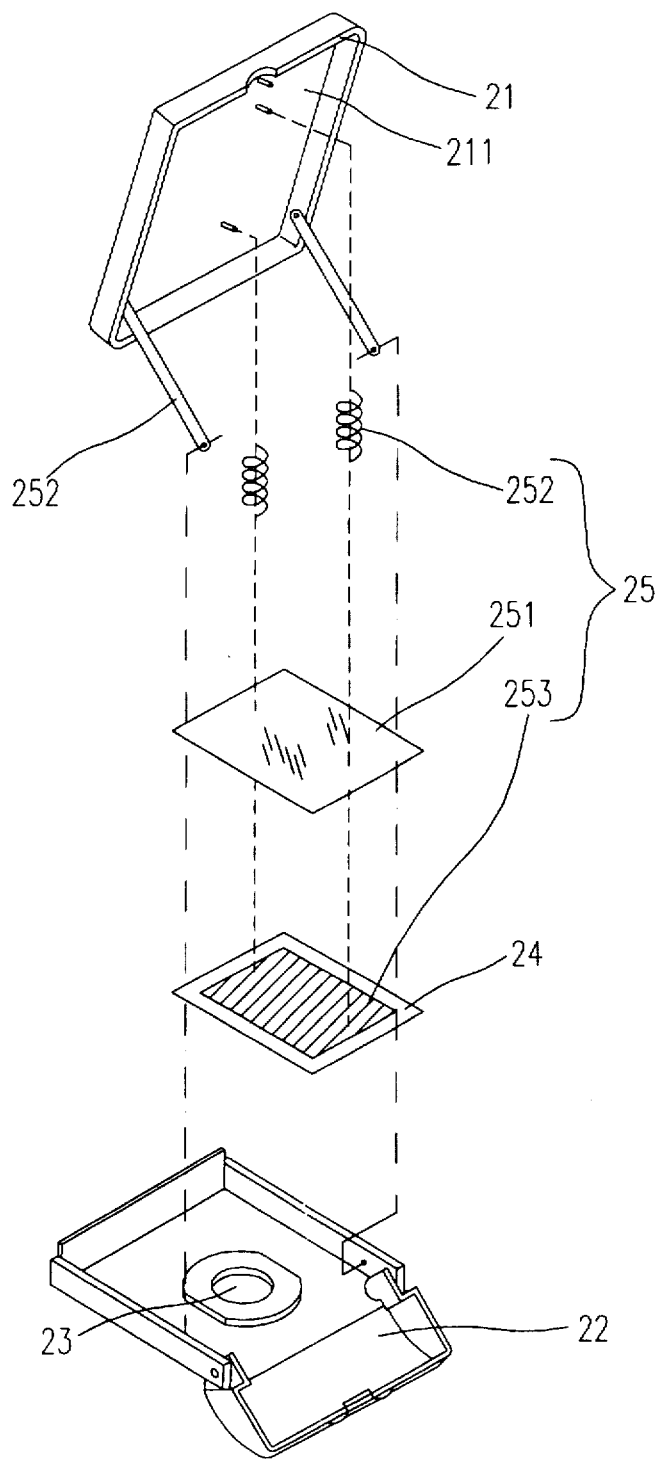
FIG. 2 is an explosive view of a preferred projecting head mechanism according to the present invention.

Please refer to FIG. 2 which is an explosive view of a preferred projecting head mechanism according to the present invention. The projecting head mechanism of the present invention comprises an upper cover 21 having an internal surface area 211, a lower cover 22 which is engaged with the upper cover 21 in a traditional manner, a focusing member 23 which is a lens is mounted on the lower cover 22, a projecting member 24 which is a projecting mirror is provided at the internal surface area 211 of the upper cover 21, and a thermo-conducting device 25 installed between the internal surface area 211 of the upper cover 21 and the projecting mirror 24. Preferably, the thermo-conducting device includes a thermo-conducting metal piece 251 which is a chaff installed between the projecting mirror 24 and the internal surface area 211 of the upper cover 21, an elastic member 252 which is a pair of springs 252 provided between the internal surface area 211 of the upper cover 21 and the thermo-conducting metal piece 251 for biasing the thermo-conducting metal piece 251 against the projecting mirror 24, and silicon compound 253 coated over the internal surface area of the projecting mirror 24.

When the external surface area of the projecting mirror 24 receives a light beam, the thermo-conducting metal piece 252 biasing against the projecting mirror 24 and the silicon compound 253 coated over the internal surface area of the projecting mirror 24 will evenly and rapidly distribute the heat generated by the light beam over the external surface area of the projecting mirror 24 to prevent concentration of the heat on a spot over the projecting mirror 24. Damage to the projecting mirror 24 can thus be avoided.

The above disclosure is not intended as limiting. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A projecting head mechanism of a projecting machine adapted to project an image generated by a non-reflective document which is penetrated through by a light beam from said projecting machine to a screen display, said projecting head mechanism comprising:

an upper cover having an internal surface area;

a lower cover engaged with said upper cover;

a focusing member mounted on said lower cover for causing said image to be focused;

a projecting member mounted on said internal surface area of said upper cover for projecting said focused image to said screen display; and thermo-conducting means provided between said projecting member and said internal surface area of said upper cover for evenly distributing said heat generated by said light beam over an outer surface area of said projecting member.

2. The projecting head mechanism of claim 1, wherein said thermo-conducting means includes:

a thermo-conducting metal piece installed between said projecting member and said internal surface area of said upper cover;

an elastic member installed between said internal surface area of said upper cover and said thermo-conducting metal piece for biasing said thermo-conducting metal piece against said projecting member; and silicon compound coated over an internal surface area of said projecting member.

* * * * *